United States Patent [19]

Danko

[11] Patent Number: 4,534,530
[45] Date of Patent: Aug. 13, 1985

[54] SUPPORT ASSEMBLY AND APPARATUS USING SAME

[75] Inventor: Arthur J. Danko, Oaklawn, Ill.

[73] Assignee: Phillips Plastics Corporation, Phillips, Wis.

[21] Appl. No.: 591,166

[22] Filed: Mar. 19, 1984

[51] Int. Cl.³ .............................................. A47G 29/02
[52] U.S. Cl. .................... 248/239; 248/224.4
[58] Field of Search ............ 248/239, 225.1, 224.4; 16/DIG. 24; 24/662, 672, 543, 297, 457, 563, 545, 485; 411/511, 512

[56] References Cited

U.S. PATENT DOCUMENTS

| | | | |
|---|---|---|---|
| 2,239,798 | 4/1941 | Tinnerman | 248/239 X |
| 2,626,772 | 1/1953 | Flora | 248/239 |
| 2,896,897 | 7/1959 | Schlueter | 248/239 |
| 2,926,409 | 3/1960 | Perry | 411/512 X |
| 2,943,373 | 7/1960 | Rapata | 24/662 |
| 3,179,367 | 4/1965 | Rapata | 248/239 |
| 3,737,128 | 6/1973 | Schuplin | 248/71 |
| 4,050,120 | 9/1977 | Yamaguchi | 411/511 |
| 4,318,208 | 3/1982 | Borja | 411/511 X |
| 4,408,372 | 10/1983 | Kimura | 24/662 |

FOREIGN PATENT DOCUMENTS

| | | | |
|---|---|---|---|
| 630836 | 11/1961 | Canada | 411/512 |
| 2329563 | 1/1975 | Fed. Rep. of Germany | 248/74 A |
| 1350099 | 12/1963 | France | 411/512 |

Primary Examiner—J. Franklin Foss
Attorney, Agent, or Firm—James E. Nilles; Thomas F. Kirby

[57] ABSTRACT

A two-piece molded plastic support assembly for mounting on a wall or door panel of a storage refrigerator or freezer compartment, comprises a grommet member which is insertable into a preformed hole from the front side of the panel and further comprises a support member which is detachably mounted on the grommet member to operatively engage a shelf or drawer or a door handle for the storage compartment. The grommet member has a grommet shank insertable into the hole on the panel's front side (prior to in-situ application of liquid insulating foam to the panel's rear side). The grommet shank comprises a resilient annular grommet flange engageable with the panel's front side to seal the panel hole against foam or air leakage and also comprises releasable exterior locking tabs for engaging the panel's rear side to lock the grommet member in place and to effect sealing action of the grommet flange. The grommet shank also has a blind bore extending axially thereinto from its front end. The support member comprises a support shank which has resiliently flexible tabs thereon which frictionally engage the grommet bore. The support member also comprises a rigid flange which overlies the grommet flange and transfers the load to the panel instead of the grommet.

7 Claims, 19 Drawing Figures

SUPPORT ASSEMBLY AND APPARATUS USING SAME

BACKGROUND OF THE INVENTION

1. Field of Use

This invention relates generally to a two-piece plastic support assembly releasably mountable in a hole in a panel and usable to support an object, such as a shelf or handle, associated with the panel. In particular, the invention relates to such a support assembly which is especially well-adapted for use with a foam-backed panel defining a wall or door of a storage compartment of apparatus, such as a refirgerator or freezer or the like.

2. Description of the Prior Art

The storage compartment in apparatus, such as a refrigerator or freezer or the like, is defined by walls and a door constructed of liners or panels which are backed by insulating batts or by foamed-in-place plastic thermal insulation. Such panels frequently take the form of relatively expensive steel sheets covered on one side with baked-on enamel, but low-cost pre-cast plastic panels are becoming more common. Support assemblies are mounted on the panel surfaces confronting the compartment and serve various purposes, such as supporting objects, including stationary or slidably movable shelves, or serving as stops to limit travel of movable components, such as slidable shelves, drawers or doors. Support assemblies are also mounted on the exterior panels of which the door is constructed to support objects such as the door handle or hinges. Support assemblies take various forms but one commonly used prior art type for use in the storage compartment comprises a plastic body of some suitable shape and having bent resilient locking wires at the rear thereof which is insertable from the compartment side of the panel through a non-circular butterfly-shaped hole therein and twisted (90° to 180°) to cause the wires to flex and lockingly engage the rear side of the panel and lock the support assembly in position under rather tight tension. Such a prior art fastener assembly is usually employed with a metal panel, because the spring tension tends to cause a more fragile plastic panel to craze or even crack. Some other commonly used prior art one-piece type fastener assemblies require either a T-shaped panel hole or a pair of holes, such as a semi-circular hole above a smaller circular hole, to prevent rotation of the fastener assemblies when in place. In use, prior art fasteners are usually inserted in pre-formed (punched, drilled or otherwise formed) panel holes after an insulating batt is emplaced or after the plastic insulation is foamed-in-place and hardened on the rear side of the plastic panel. The manufacturing technique employing in-situ foaming requires the pre-formed panel holes to be covered by masking tape before the in-situ foaming is carried out in order to prevent liquid foam leakage therethrough and to eliminate the need to remove hardened leakage foam from the finished panel surface and thereby ensure tight sealing of the hole by the subsequently-inserted fastener assembly. Furthermore, such subsequent insertion of the fastener assembly requires that it pierce the tape and be forced into the hardened foam therebehind. This can be relatively difficult and time-consuming when done manually, if correct placement is to be acheived. Then, too, prior art support assemblies are difficult to remove and replace, if necessary, without damaging the panel or other portions of the appliance. It is also noteworthy that the externally mounted door handles which are secured to fastener assemblies suitable therefor can either be put on before unit shipment or be put on by the service man or consumer. These handles can be mounted on the face or side edges of the door panel to accomplish the final mount. There is a movement in the industry to eliminate all exterior hardware such as projecting handles, to cut down on the size of the unit shipping containers and thus allow for the increase in shipment size per tractor trailer or railroad car to further reduce costs.

The following two patents exemplify the prior art support assemblies which have wire clips associated therewith: U.S. Pat. Nos. 3,565,504 and 2,896,897. The following three patents exemplify support assemblies which are merely inserted through a hole in a panel from the compartment or front side of the panel and on which a shelf directly rests: U.S. Pat. Nos. 2,620,255, 2,665,101 and 2,657,894. The following three patents disclose multicomponent support assemblies in which a first component is inserted through a panel hole from the rear side of the panel and a second component is connected to the first component from the compartment or front side of the panel: U.S. Pat. Nos. 3,826,458, 3,264,699 and 3,917,206. In the two last-recited patents the first component is emplaced prior to in-situ installation of insulating foam. The following three patents each disclose a support assembly in which three separate components, including an expansion member such as a screw or rivet, are installed from the compartment or front side of the panel. In U.S. Pat. No. 3,469,493, a screw or pin is required in certain embodiments to effect expansion and to secure the components together in locked association in the panel hole.

SUMMARY OF THE INVENTION

In accordance with the invention there is provided an improved support means or support assembly for releasable mounting in a hole in a panel and for operatively engaging an object, such as a shelf, a movable component, a handle or the like, associated with the panel. The support assembly comprises a grommet member releasably mountable in the hole in the panel in sealed relationship with the edge of the hole and having portions extendable from the hole on opposite sides of the panel, and a support member detachably mountable on the grommet member and extendable from a side of the panel for engagement with the object.

In a preferred embodiment of the support assembly the grommet member is molded of resilient plastic and comprises a grommet shank for insertion into the hole from one accessible side of the panel. The grommet member also comprises a flexible resiliently deformable grommet flange which extends circumferentially outwardly at one end of the grommet shank for engaging the said one side of the panel and operates to seal the edge of the hole. The grommet member also comprises a plurality of resilient locking projections which are axially spaced from the grommet flange and project outwardly from the grommet shank for engagement with the other side of the panel, whereby cooperation of the locking projections and the grommet flange with the panel releasably locks the grommet member against axial displacement in the hole and also effects sealing deformation of the grommet flange. The grommet member also comprises a blind bore extending inwardly from the said one end of the grommet shank.

In a preferred embodiment of the support assembly the support member is molded of relatively non-resilient plastic and comprises a support shank or stem having non-resilient inflexible laterally extending axially spaced apart serrations on the outer surface thereof and removably insertable axially into the blind bore in the grommet member. The support member further comprises an outer support portion which is adapted to operatively engage the object, such as a shelf, a drawer, a door handle or the like. The support member also comprises an outwardly extending rigid flange means located between the support shank and the support portion. When the grommet member and support member are connected, the rigid flange means overlies said deformable grommet flange and engages said one side of the panel to transfer loads imposed by the object to the panel instead of to the grommet member.

Although the support assembly is usable with any panel having a hole therethrough, it is especially well-suited or adapted for use in apparatus such as a refrigerator or freezer, having an insulated storage compartment wherein the panel, which has front and rear sides, defines a wall of the storage compartment or a surface of a door therefor and has a hole therethrough for mounting the support assembly, which hole needs to be sealed during installation of foamed-in-place plastic insulating foam backing or installation of an insulating batt on the rear side of the panel.

If solidified foamed-in-place plastic insulation is used, it adheres to the rear side of the panel and to that portion of the grommet member extending from the hole on the rear side of the panel. The resiliently deformable grommet flange on the grommet member is disposed on the front side of the panel and is engaged therewith to effect the sealed relationship with the edge of the hole. An annular recess is provided in the surface of the grommet flange confronting the front side of the panel to enable resilient movement of said grommet flange thereagainst to effect the seal. Recesses are provided in the relatively rigid flange means of the support member for accommodating the grommet flange and enabling engagement of the flange means with the front side of the panel to effect load transfer.

A support assembly and apparatus using the same offers many advantages over the prior art. For example, provision of a two-piece assembly enables the grommet member to be shaped to fit any one of several differently-configured standard panel holes presently employed in the industry (such as square, T-shaped, butterfly shaped) and also enables the support member to be shaped to perform whatever particular function is desired, i.e. to support a stationary shelf or a slidable shelf or to serve as a stop for a movable component or to serve as a hook from which something can be hung or to serve to support a door handle. Pre-insertion of the grommet member into the panel hole in sealed relationship prior to in-situ foaming eliminates the need to tape the hole to prevent liquid foam leakage, eliminates the need to clean leaked foam, ensures an adequate thermal seal ab initio, and does away with the task of manually inserting the support assembly through tape and into hardened plastic foam. The grommet flange is relatively thin, very flexible and resilient and provided with an annular recess on its underside thereby ensuring a positive seal against foam leakage onto the front side of the panel or air or thermal leakage into or from the compartment defined by the panel, ensuring a positive locking of the grommet member in the panel hole, and ensuring that a plastic liner will not be bowed or deformed or crack as a result of mounting of the grommet member. The support member is removable from the grommet member thus enabling substitution of one type of support member or another. Loads imposed on the support member, as by a shelf or a door handle, are transferred to the panel rather than to the grommet member thus ensuring that the latter is not pulled out of the panel hole and that the panel is not damaged or deformed. A door handle employing a support assembly in accordance with the invention can be left unattached to a refrigerator or freezer door while the latter is in a shipping crate and subsequently attached after the unit is delivered to a customer, thereby conserving shipping space and offering the customer a choice of attachable handles which differ in color or style. Other objects and advantages of the invention will hereinafter appear.

DRAWINGS

DESCRIPTION OF PREFERRED EMBODIMENTS

Figure 1:
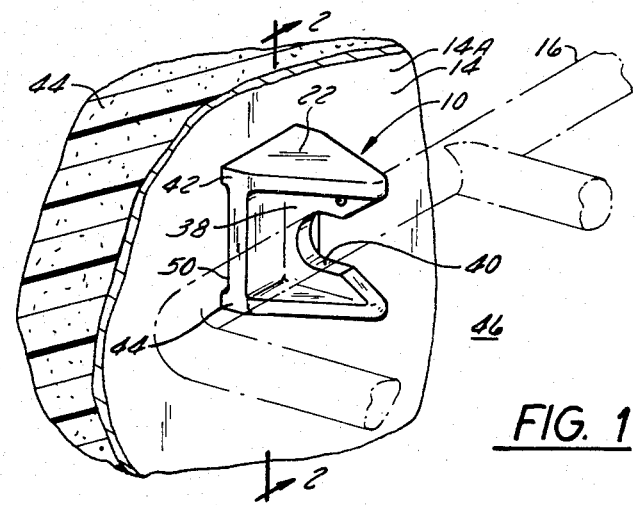
FIG. 1 is a perspective view of a support assembly in accordance with the invention and showing it in association with apparatus, such as a refrigerator or freezer, including a portion of a foam insulation-backed panel defining a storage compartment wall on which it is mounted and a portion of an object, such as a wire-rack type shelf, which it supports.
Figure 2:
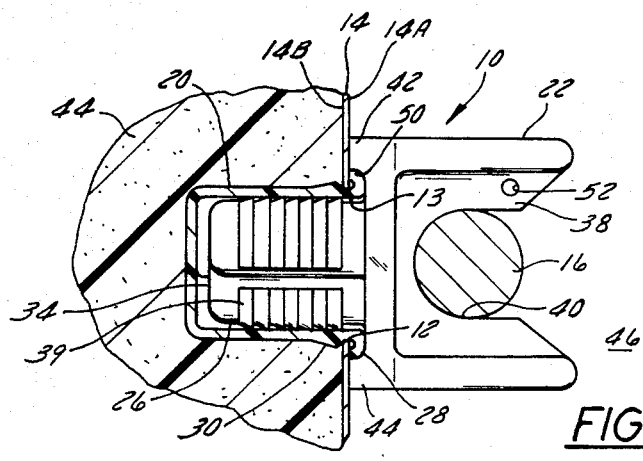
FIG. 2 is a cross-section view of the grommet member and support member of the support assembly and apparatus of FIG. 1 taken on line 2—2 of FIG. 1.
Figure 12:
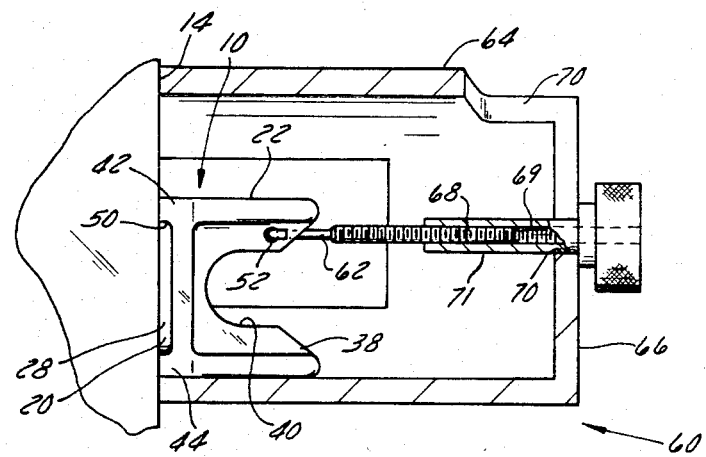
FIG. 12 is a cross-section view of a tool employed to withdraw the support member from the grommet member.
Figure 4:
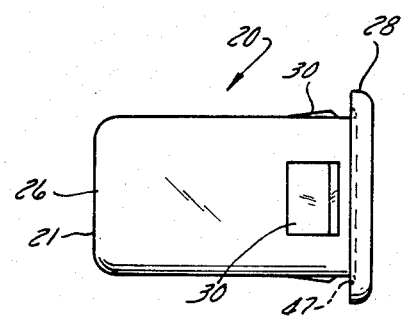
FIG. 4 is a top plan view of the grommet member.

Referring to FIGS. 1 and 2, the numeral 10 designates an improved support means or support assembly in accordance with the invention for releasable mounting in a hole 12 of generally T-shaped configuration in a panel 14 and for operatively engaging an object, such as a wire-rack-type shelf 16 or the like, associated with the panel. The support assembly 10 comprises a grommet member 20 releasably mountable in hole 12 in sealed relationship with the edge 13 of the hole and having portions extendable from the hole on opposite sides of panel 14, and a support member 22 detachably mountable on the grommet member and extendable from a side 14A of the panel for engagement with shelf 16.

As FIGS. 2 through 7 show, grommet member 20 is molded of resilient plastic, such as Nylon (TM) or polyethylene, and comprises a grommet shank 26 for insertion into hole 12 from one side 14A of panel 14. A flexible resiliently deformable grommet flange 28 extends circumferentially outwardly at one end of the grommet shank for engaging panel side 14A and operates to seal the space between hole edge 13 and the grommet shank. A plurality of (four) resilient locking projections or tabs 30 are axially spaced from grommet flange 28 and project outwardly from the exterior of the grommet shank for engagement with panel side 14B, whereby cooperation of the locking projections and the grommet flange with panel 14 releasably locks grommet member 20 against axial displacement in hole 12. A blind bore 32, closed at its inner end, extends inwardly from the flanged end of grommet shank 26 into grommet member 20.

As FIGS. 1, 2 and 8 through 11 show, support member 22 is molded of non-resilient waterproof, mildew-resistant plastic (such as polypropylene, acetal or ABS plastic) and comprises a support shank or stem 34 having non-resilient inflexible serrations 36 on the outer surface thereof. Stem 34 is removably insertable axially into bore 32 in grommet member 20. Support member 22 further comprises an outer support portion 38 adapted, as by a slot 40, to supportably engage shelf 16 or some other object. A rearwardly extending flange means comprising upper and lower portions 42 and 44 is located between support shank 34 and support portion 38 of support member 22 and is engaged in FIGS. 1 and 2 with panel side 14A so as to transfer loads imposed by shelf 16 thereto instead of to grommet member 20.

Figure 6:
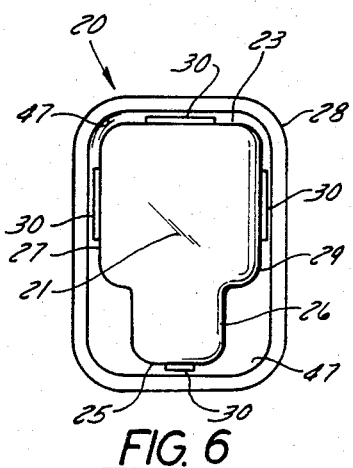
FIG. 6 is an end elevation view of the closed end of the grommet member.
Figure 3:
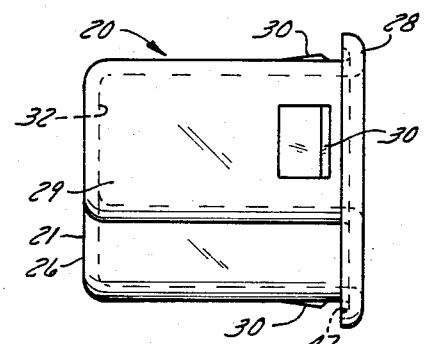
FIG. 3 is an enlarged side elevation view of the grommet member.
Figure 7:
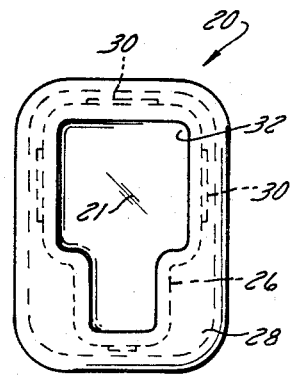
FIG. 7 is an end elevation view of the open end of the grommet member.
Figure 5:
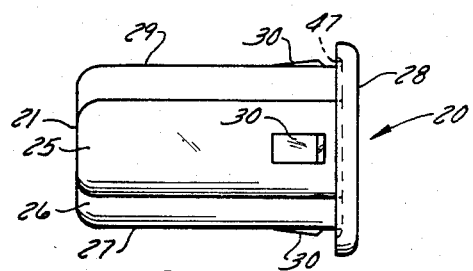
FIG. 5 is a bottom plan view of the grommet member.
Figure 10:
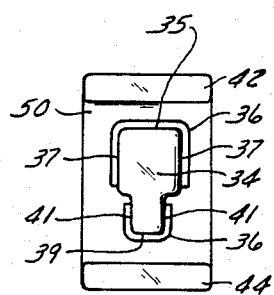
FIG. 10 is an end elevation view of the stem end of the support member.

As FIGS. 3 through 7 show, grommet member 20 is configured as follows. Grommet flange 28 is of rectangular configuration in plan view, as FIGS. 6 and 7 show, whereas grommet shank 26 and bore 32 therein have a generally T-shaped configuration corresponding in size and shape to hole 12 in panel 14. In addition to an end wall 21 closing bore 32, grommet shank 26 comprises generally flat but somewhat flexible upper and lower walls 23 and 25 and a pair of stepped side walls 27 and 29 on which the slope-surfaced locking tabs 30 are integrally formed. The tabs 30 are resiliently depressable inwardly toward bore 32 during insertion of grommet member 20 into hole 12 due to the flexibility and resilience of the shank walls but then spring back to locking position.

Figure 8:
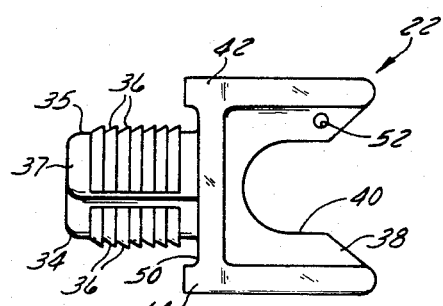
FIG. 8 is an enlarged side elevation view of the support member.
Figure 11:
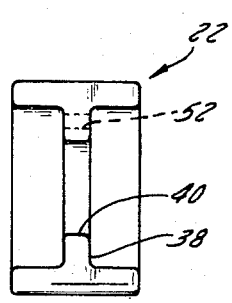
FIG. 11 is an end elevation view of the support end of the support member.
Figure 9:
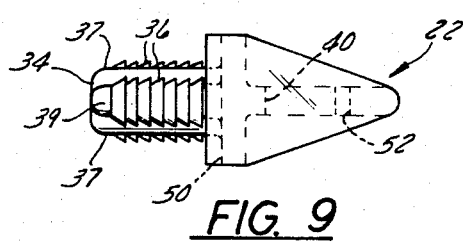
FIG. 9 is a bottom plan view of the support member.
Figure 13:
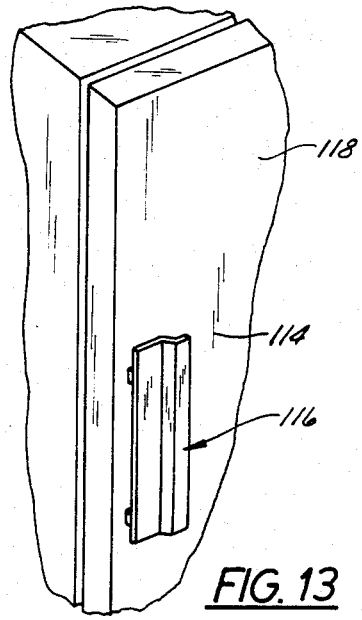
FIG. 13 is a perspective view of a portion of a vertically disposed horizontally pivotable door for apparatus, such as a refrigerator or freezer, and showing an object, such as a door handle, which is understood to be secured to a panel defining the exterior of the door by a pair of support assemblies in accordance with the invention.
Figure 17:
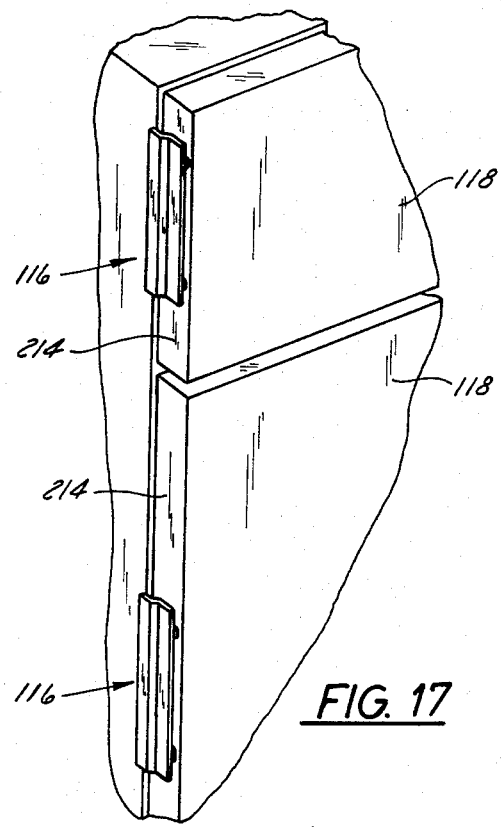
FIG. 17 is a view similar to FIG. 13 but showing a pair of swingable vertical doors, one above the other, with handles connected to vertical edges of the doors.

As FIGS. 8 through 11 show, support member 22 is configured as follows. Support stem 34 has a cross-sectional configuration corresponding in shape to but smaller in size than the cross-sectional configuration of bore 32 in grommet member 20 into which it is insertable. The upper surface 35 and upper side surfaces 37 of support stem 34 are provided with a plurality of non-resilient inflexible serrations 36. The lower surface 39 and lower side surfaces 41 of support stem 35 are also provided with similar serrations 36. The serrations 36, which have V-shaped cross-sectional configurations, extend outwardly sufficiently far and are orientated as shown in FIGS. 8 and 9 (i.e. laterally extending and axially spaced apart) so as to frictionally engage the somewhat softer and resilient walls defining bore 32 in grommet member 20 and bend to allow insertion of support stem 35 into the bore. The serrations allow easy insertion but difficult removal of stem 35 relative to bore 32.

Although support assembly 10 is usable with any two-sided panel having a hole of suitable size and configuration therethrough, it is especially well-suited or adapted for use in apparatus, such as a domestic refrigerator or freezer, for example, having an insulated storage compartment wherein panel 14 defines a wall of the storage compartment and has hole 12 therethrough and plastic insulating foam 44 backing the panel, as FIGS. 1 and 2 show.

As FIG. 2 shows, in such apparatus support assembly 10 is adapted to engage shelf 10 which is understood to be located in a storage compartment designated by numeral 46 and is releasably mounted in panel hole 12 in sealed relationship with hole edge 13. Portions of support assembly 10 extend from hole 12 on opposite sides 14A and 14B of panel 14, 14A being a front side and 14B being a rear side of panel 14. That portion of support assembly 10 extending from hole 12 on panel side 14A and into storage compartment 46 is adapted to engage shelf 16 and performs a useful function with respect thereto, i.e. supports it. The solidified foamed-in-place plastic insulation 44 adheres to panel side 14B and to that portion of support assembly 10 extending from hole 12 on panel side 14B.

More specifically, grommet member 20 of support assembly 10 is releasably mounted in hole 12 in sealed relationship with hole edge 13 and has portions extending from the hole on opposite sides 14A, 14B of panel 14. Support member 22 of support assembly 10 is detachably mounted on grommet member 20 and extends from panel side 14A into storage compartment 46 and adapted to engage shelf 16.

The solidified foamed-in-place plastic insulation 44, which is supplied in a conventional manner after grommet member 20 is in place, adheres to panel side 14B and to that portion of shank 26 of grommet member 20 extending from hole 12 on panel side 14B. Resiliently deformable grommet flange 28 on grommet member 20 is disposed on panel side 14A and is engaged therewith to effectively seal the space between hole edge 13 and shank 26. An annular recess 47 is provided in the surface of grommet flange 28 confronting panel side 14A to enable resilient movement of the grommet flange thereagainst during locking insertion of grommet member 20 to effect the seal. Recesses 50 are provided between upper and lower rigid flanges 42, 44 and shank 26 of support member 22 for accommodating grommet flange 28 and enabling engagement of the flanges 42, 44 with panel side 14A to effect load transfer.

As FIGS. 8, 9, 11 and 12 show, means are provided to effect removal or withdrawal of support member 22 from grommet member 20 and such means take the form of a small hole 52 provided in outer support portion 38 of the support member. Hole 52 is adapted to be engaged by a tool 60 (FIG. 12) which includes a hook 62 which facilitates such withdrawal.

When support member 22 is so pulled, it is necessary or desirable, if panel 14 is made of plastic instead of metal, to exert a counter-force against panel 14 to prevent it from flexing unduly and suffering deformity or damage. A suitable tool 60 is employed to exert a pulling force and counter-force simultaneously. Tool 60 takes the form of a rigid hollow cylindrical member 64 open at one end and provided at the other end with a wall 66 having an axially shiftable rotatable screw 68 extending through a threaded hole 69 in a sleeve 71 non-rotatably disposed in a slot 70 in the end wall 66 of the cylinder 64 and rotatably attached to hook 62 engaged in hole 52. Thus, hook 62 is manipulatable to engage or be released from the hole 52 in support member 22 by moving sleeve 71 up or down in slot 70. Manual rotation of screw 68 while manually urging the open end of the cylinder member 64 against panel 14 around support assembly 10 would effect withdrawal of member 22 while a counter-force is exerted against the panel 14 around assembly 10.

Figure 19:
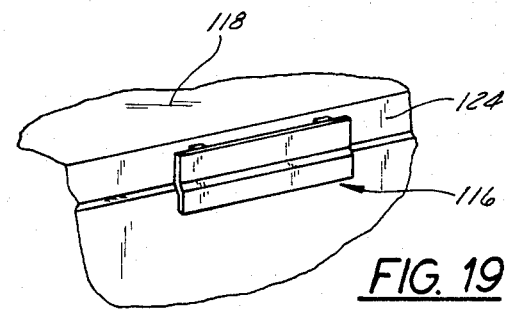
FIG. 19 is a view similar to FIG. 13 but showing a swingable horizontal door with a handle connected to a horizontal edge of the door.
Figure 18:
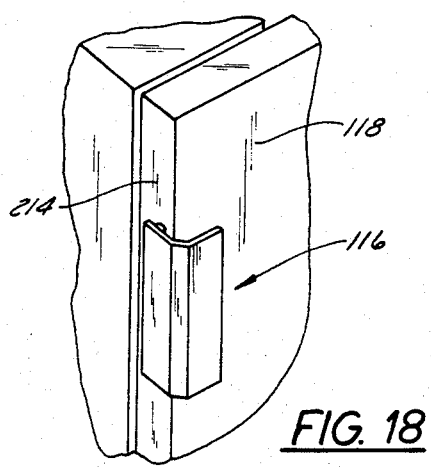
FIG. 18 is a view similar to FIG. 13 but showing a swingable vertical door with a handle of L-shaped cross-section connected to a vertical edge of the door.
Figure 16:
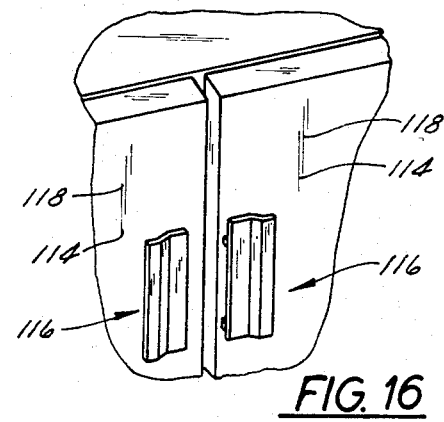
FIG. 16 is a view similar to FIG. 13 but showing a pair of swingable vertical doors arranged side-by-side and handles therefor connected to the front surface of the doors.
Figure 15:
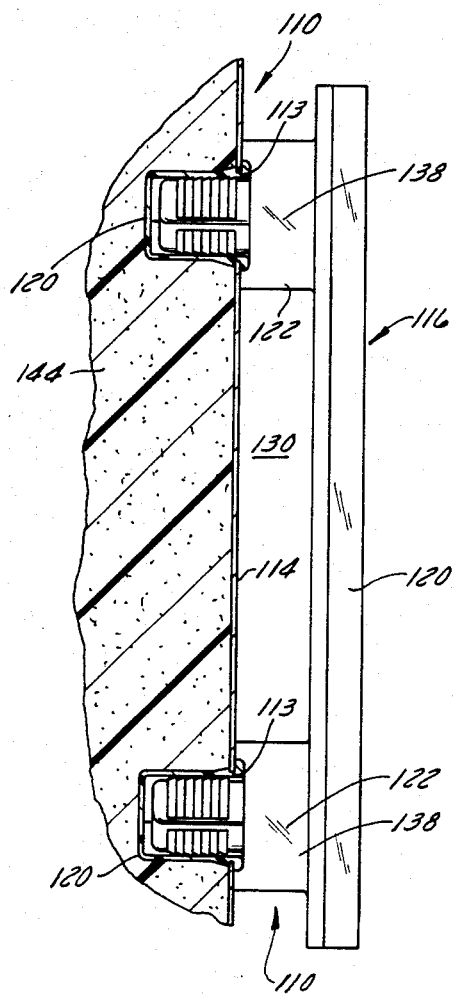
FIG. 15 is an enlarged cross-section view of the handle and pair of support assemblies therefor taken on line 15—15 of FIG. 13.
Figure 14:
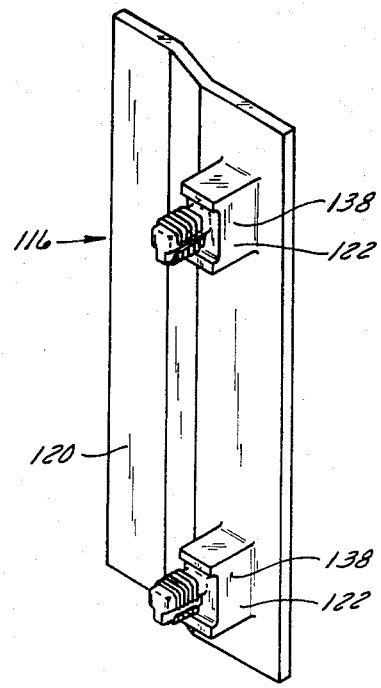
FIG. 14 is an enlarged perspective view of the rear side of the handle of FIG. 13 and showing a pair of support members which are attached to the handle and connectable to a pair of grommet members which form part of the pair of support assemblies.

FIGS. 1 through 11 disclose an embodiment of the invention wherein the support member 22 is especially well-adapted by its shape to releasably support a shelf or rack 16 in the storage compartment 46 of a refrigerator or freezer. FIGS. 13 through 18, however, disclose an embodiment of the invention wherein a pair of support assemblies 110 are used to detachably connect a handle 116 to a front panel 114 or an edge panel 214 of a door 118 of a refrigerator or freezer. Handle 116 takes the form of a rigid member 120 defining a handle portion which has a pair of support members 122 attached to the rear side thereof. Preferably, rigid member 120 and the support members 122 are integrally formed of molded plastic. Each support member 122 is substantially identical to the support member 22 hereinbefore described, except that the outer support portion 138 thereof takes the form of a cubic spacer block instead of having a slot 40 to accommodate a shelf 16, as FIGS. 14 and 15 show. As FIG. 15 shows, each support assembly 110 comprises a grommet member 120 which is identical in all respects to the grommet member 20 hereinbefore described. When handle 116 is attached to door panel 114, as shown in FIG. 15, or to an edge panel 214 (FIGS. 17, 18, 19) a finger-receiving space 130 exists between rigid member 120 and the panel.

As will be understood, during manufacture of the refrigerator or freezer, the support members 120 are emplaced in the holes 113 in panel 114 prior to application of the in-situ foam 144. However, the handle 116 is not attached to the panel 114 until some later stage, as when the unit is delivered to a store or customer and unpacked from its shipping crate.

As will be further understood, the forces holding the handle 116 in its installed position are greater than those imposed on the handle when a door 116 is pulled open and, therefore, unintentional detachment of the handle from the door does not occur. However, if the door is intentionally held stationary by suitable force, handle 116 can be detached by separation of the support members 122 from the grommet members 120.

I claim:

1. In combination:
   a panel having a hole therethrough and having a front side and an opposite rear side;
   and a support assembly for engaging an object to be associated with said front side of said panel and including a grommet member formed of relatively resilient plastic and a support member formed of relatively non-resilient plastic, said grommet member having a bore therein extending inwardly from said front side of said panel and closed at its other end,
   and said support member being mounted in said bore and engageable with said object;
   said grommet member being releasably mounted by insertion into said hole from said front side of said panel and having portions extending from said hole on the front and rear sides of said panel;
   the portion of said grommet member extending on said front side of said panel comprising a resiliently deformable flange disposed on said front side of said panel and engaged therewith to effect a sealed relationship of said grommet member with said edge of said hole;
   said grommet member further comprising resilient locking projections disposed on said rear side of said panel and releasably engaged therewith to effect releasable mounting of said grommet member in said hole and to effect resilient deformation of said deformable flange;
   said support member including a serrated rigid shank removably inserted into said blind bore in said grommet member and having a support portion extending from said front side of said panel for engagement with said object and including a rigid flange engageable with said front side to transfer a load thereto.

2. A support assembly for releasable mounting in a hole in a panel and for operatively engaging an object associated with said panel, said support assembly comprising:
   a relatively resilient plastic grommet member, said grommet member comprising a shank for insertion into said hole from one side of said panel, a flexible deformable grommet flange extending circumferentially outwardly at one end of said shank for engaging said one side of said panel and operating to seal said hole, a plurality of resilient locking projections axially spaced from said flange and projecting outwardly from said shank for engagement with the other side of said panel whereby cooperation of said locking projections and said flange with said panel releasably locks said grommet against axial displacement in said hole, and effects deformation of said flexible grommet flange and a blind bore extending inwardly from said one end of said shank;
   and a relatively non-resilient plastic support member releasably mountable on said grommet member, said support member comprising a support shank having non-resilient inflexible serrations extending transversely on the outer surface thereof and releasably insertable into said bore in said grommet member, said support member further comprising an outer support portion adapted to supportably engage said object, and an outwardly extending rigid flange means between said support shank and said support portion and engageable with said one side of said panel to transfer loads thereto instead of to said grommet member.

3. A support assembly according to claim 2 wherein an annular recess is provided in the surface of said grommet flange confronting said one side of said panel to enable resilient movement of said grommet flange against said one surface to effect a seal in response to engagement of said locking projections.

4. A support assembly according to claim 2 or 3 wherein a recess is provided in said flange means of said support member for accommodating said grommet flange and enabling engagement of said flange means with said one side of said panel.

5. A combination according to claim 1 further including solidified foamed-in-place plastic insulation adhering to said rear side of said panel and to that portion of said grommet member extending from said hole on said rear side of said panel.

6. A combination according to claim 5 wherein said object is a shelf connected to sais support member.

7. A combination according to claim 5 wherein said object is a handle connected to said support member.

* * * * *